United States Patent

Bachelard

[15] 3,645,681

[45] Feb. 29, 1972

[54] PRODUCTION OF GASEOUS HYDROGEN FLUORIDE

[72] Inventor: Roland Bachelard, Lyon, France

[73] Assignee: Ugine Ruhlmann, Paris, France

[22] Filed: July 8, 1970

[21] Appl. No.: 53,300

Related U.S. Application Data

[63] Continuation-in-part of Ser. No. 737,327, June 17, 1968, abandoned.

[30] Foreign Application Priority Data

May 30, 1967 France........................108352
Oct. 27, 1967 France........................126140

[52] U.S. Cl............................23/153, 23/19, 23/21, 23/88, 23/193, 23/345, 23/352
[51] Int. Cl......................C01b 7/22, C01b 9/08, C01b 1/16
[58] Field of Search...............23/153, 50, 88, 193, 19 V, 23/345, 352

[56] References Cited

UNITED STATES PATENTS

| | | | |
|---|---|---|---|
| 2,659,655 | 11/1953 | Sweet | 23/88 X |
| 3,005,685 | 10/1961 | Riedl et al. | 23/88 |
| 3,195,979 | 7/1965 | Burkert et al. | 23/153 |
| 3,338,673 | 8/1967 | Peterson et al. | 23/153 |
| 3,476,509 | 11/1969 | Jones | 23/50 |
| 3,525,584 | 8/1970 | Kidde | 23/88 |

*Primary Examiner*—Edward Stern
*Attorney*—Webb, Burden, Robinson and Webb

[57] ABSTRACT

A process for preparing substantially pure gaseous hydrogen fluoride from ammonium bifluoride by reacting a product containing ammonium bifluoride with a metal fluoride or a double fluoride of ammonium and metal at a temperature up to 500° C. to produce substantially pure gaseous hydrogen fluoride and a fluometallate. The fluometallate can thereafter be decomposed into gaseous ammonium fluoride and the metal fluoride or double fluoride of ammonium and metal. The process is conducted under anhydrous medium reaction conditions, and the starting materials are solid prior to being heated.

11 Claims, No Drawings

PRODUCTION OF GASEOUS HYDROGEN FLUORIDE

This is a continuation-in-part application of Ser. No. 737,327, filed June 17, 1968, now abandoned, having the same title.

Gaseous mixtures are discharged in many industrial processes which, as residues or impurities, contain fluoro compounds. Frequently, these compounds are in the form of hydrofluoric acid or silicon tetrafluoride, or their mixtures.

This invention relates to the production of substantially pure gaseous hydrogen fluoride and, more particularly, to an economic process for producing this hydrogen fluoride from ammonium bifluoride recovered from industrial waste gases.

Different methods have been suggested for the elimination of the fluoroderivatives from these gaseous mixtures. Most of these methods are based upon washing or scrubbing the gases. Some of the methods result in a more or less concentrated solution of fluosilicic acid. Others employ ammonia and result in solutions of ammonium fluoride after the separation of silica by filtration. The ammonium fluoride solutions, regardless of how they are produced, may be heated at a temperature normally lying between 60° and 200° C., to drive off the ammonia, to obtain anhydrous ammonium bifluoride or a practically anhydrous mixture very rich in bifluoride.

Attempts have been made to extract the fluorine contained in the fluorides in the form of hydrofluoric acid. For example, it has been suggested that anhydrous ammonium bifluoride be reacted with concentrated sulphuric acid at approximately 190° C., whereby up to 98 percent of the fluorine present in the bifluoride may be recovered in the form of anhydrous hydrofluoric acid. The ammonia is recovered as ammonium bisulphate. The recovery of ammonia as a low-value salt is a serious disadvantage to the production of hydrofluoric acid by this process. Moreover, the process must be carried out in a very special plant because of the corrosive environment. In fact, it is very difficult because of the unavoidable and well-known corrosion problem. These drawbacks render it impossible to apply an industrial cycle in which bases containing fluoro products, absorbable by an ammoniacal solution, could be washed with this solution, heated to obtain ammonium bifluoride, and the bifluoride processed with concentrated sulphuric acid to obtain the anhydrous hydrofluoric acid.

I have invented a novel process for the treatment of ammonium bifluoride in order to extract substantially pure gaseous hydrogen fluoride therefrom without the disadvantages of the prior methods. This novel process does not utilize sulphuric acid and the problems caused by corrosion are negligible. My invention is based on the property of numerous metals, such as Bi, Cd, Co, Cu, Mn, Zn, Mg, Fe, Ni, Ge, Sn, Th, Ti, Al, In, Zr, Cr, Be, Ga, V, Sc, Pb, Hf, Sb, and U, in particular, of yielding stable ammonium fluometallates or double fluorides of metal and ammonium which are decomposable by heat, and render it possible to effect separate recovery of the metal fluoride and ammonium fluoride for subsequent use. It is known that the fluometallates formed are stable and, further, they are decomposable by heat.

Briefly stated, my invention consists of reacting solid ammonium bifluoride or a product containing ammonium bifluoride with a solid metal fluoride to form a fluometallate and release substantially pure gaseous hydrogen fluoride. The temperature of the reaction should be at least equal to that of the point of fusion of the reagent with the lowest fusion point but less than the temperature of decomposition of fluometallate formed. After the release of gaseous hydrogen fluoride has substantially ceased and it has been collected, the temperature is increased to a temperature which will decompose the fluometallate. Ammonium fluoride is collected in the gaseous stage and metal fluoride is collected in the condensed stage. The metal fluoride may then be recycled.

In the process I prefer to use a simple metal fluoride chosen, for example, from the fluorides of Bi, Cd, Co, Cu, Mn, Zn, Mg, Fe, Ni, Ge, Sn, Th, Ti, Al In, Zr, Cr, V, Be, Ga, Sc, Pb, Hf, Sb and U. On the basis of tests, experimentation and analysis, it has been determined that the above-identified metal fluorides will react with a solid ammonium bifluoride compound to form substantially pure gaseous hydrogen fluoride and an ammonium fluometallate under the subject process conditions. A double fluoride of ammonium and metal may also be used. If a double fluoride is used, it must have a lower index than the double fluoride formed. Thus, double fluorides of ammonium and of metals such as Al, Fe, Zr, In, Cr, U and V are satisfactory.

Using a trivalent metal as an example, the reactions of the process using a simple metal fluoride are:

$$3NH_4F \cdot HF + MF_3 \rightarrow (NH_4)_3MF_6 + 3HF \text{ (gas)} \quad (1)$$

$$(NH_4)_3 MF_6 \rightarrow MF_3 + 3NH_4F \text{ (gas)} \quad (2)$$

The reactions in the process using a double fluoride may be written as follows:

$$2NH_4F \cdot HF + NH_4MF_4 \rightarrow (NH_4)_3MF_6 + 2HF \text{ (gas)} \quad (3)$$

$$(NH_4)_3MF_6 \rightarrow NH_4MF_4 + 2NH_4F \text{ (gas)} \quad (4)$$

It is apparent that the process renders it possible to recover the quantity of fluorine present in the bifluoride employed, in the form of ammonium fluoride.

The initial heating of the mixture of solid ammonium bifluoride and solid metal fluoride may be continued to complete the conversion into fluometallate and gaseous hydrogen fluoride. A rate of conversion of 100 per cent cannot, however, be achieved since, in addition to the fluometallate required, the resulting solid contains unconverted metal fluoride and ammonium bifluoride. However, since this solid is exposed to a second heating action, the metal fluoride and the ammonium bifluoride will be recovered either as they are or in the form of their decomposition products, with the solid and gaseous products emerging from the second heating action.

The quantity of metal fluoride employed is at least equal to the quantity corresponding stoichiometrically to the bifluoride empolyed. The temperature applied to cause reaction between the ammonium bifluoride and the metal fluoride depends on the metal employed. Although temperatures of up to 500° C. may be utilized, temperatures lying between 125° and 200° C. are preferable. It is preferable to apply relatively low temperatures, in particular, temperatures only slightly above the melting temperature of the bifluoride employed in order to prevent pollution of the gaseous hydrogen fluoride by ammonium fluoride. The formation by decomposition of certain fluometallates is appreciable at temperatures such as 200° C.

It may be advantageous to operate under a pressure slightly greater than atmospheric pressure in order to slow the rate of decomposition of the fluometallate formed. The higher pressure permits use of a relatively high temperature in promoting the kinetics of gaseous HF release without encountering the drawbacks of inopportune release of ammonium fluoride.

The temperature used for the decomposition of the fluometallate is closely linked with the metal employed. The fluometallates that may be employed according to the invention decompose at speeds which depend upon the temperature applied, and a heating temperature will be chosen for each of these for which its speed of decomposition is optimum. In general, the temperature chosen will be distinctly higher than the temperature used for the formation of the fluometallate with release of the hydrogen fluoride required.

It is clear that the process described may be applied successfully in a cycle for the recovery of fluoro products from a gaseous mixture containing these. A cycle of this nature comprises washing the gases with an ammoniacal solution according to known processes, heating these solutions to extract solid ammonium bifluoride and a quantity of gaseous ammonia corresponding to that which has been absorbed by the fluoro products during washing, and then treating the bifluoride according to the process herein described. It is plain that a cycle of this kind recovers the absorbable fluoro products contained initially in the gaseous mixture, in the form of HF, without this extraction requiring a consumption of ammonia or of some other reactant.

The following examples are illustrative of my invention:

EXAMPLE 1

A solution of ammonium fluoride was obtained by washing gas containing hydrofluoric acid and silicon tetrafluoride coming from a plant producing superphosphates.

The gaseous effluent from the decomposition of ammonium hexafluoaluminate resulting from a prior operation, was added to this solution. This solution was heated to 180° C. to obtain molten ammonium bifluoride and gaseous ammonia. The solid bifluoride was mixed with anhydrous aluminum fluoride in excess relative to the stoichiometrical amount. This mixture was placed in a closed reactor, equipped with a gas inlet and outlet, and placed in a progressively heated oil bath. When the reactor reached 147° C., gaseous HF was released at a rate that increased rapidly with the temperature. The entrainment of HF was assured by means of a flow of nitrogen and a slight overpressure maintained in the reaction enclosure (9 cms. of mercury above atmospheric pressure). At the end of 1½ hours at these temperatures and pressure conditions, more than 90 per cent of the hydrofluoric acid was released and recovered. No ammonia could be detected in the acid obtained.

The residual solid consisting principally of ammonium fluoaluminate (also known as ammonic cryolite), aluminum fluoride and nondecomposed ammonium bifluoride, was heated to 450° C. The gaseous mixture released, principally consisting of ammonium fluoride combined with the gaseous decomposition products of ammonium bifluoride, was recycled into the solution of ammonium fluoride. The solid resulting from the same heating action was mixed with a fresh batch of bifluoride. The gaseous ammonia released during conversion of the solution of ammonium fluoride into bifluoride was employed again for treating another volume of gas, thus forming another batch of solution of ammonium fluoride.

Substantially pure gaseous hydrogen fluoride was obtained, practically without consumption of reactant.

EXAMPLE 2

As intimate a mixture as possible of 10 g. of ammonium bifluoride originating from the evaporation, according to known processes, of a solution of ammonium fluoride and 10 g. of anhydrous aluminum fluoride (AlF$_3$) resulting from the thermic decomposition of ammonic cryolite formed during an earlier cycle in a Monel metal reactor without heating. The quantity of AlF$_3$ exceeded the stoichiometrical quantity by 32 per cent.

When the mixture was homogeneous, the reactor was closed and subjected to progressive heating in an oil bath. Scavenging with nitrogen established an overpressure of 5 cms. of mercury in the reaction enclosure. At 180° C., the release of gaseous hydrogen fluoride became noticeable. The process evolved at constant temperature with increasing speed which reached its maximum value at the end of 32 minutes when the rate of reaction amounted to 45 per cent. The temperature was maintained throughout the test, which was completed after 2 hours with an HF yield of 97.1 per cent, and the yield exceeded 95 per cent after 75 minutes.

Dosing disclosed the total absence of ammonia from the hydrogen fluoride recovered.

The residue of the operation appeared in the form of a relatively hard sintered cake. Heating the cake to 450° C., allowed recovery of the quantity of AlF$_3$ employed, on the one hand, and of a gaseous ammonium fluoride corresponding in quantity to the bifluoride decomposed, on the other hand. These two products could be employed again in another cycle of operation.

EXAMPLE 3

19.327 g. of ZrF$_4$ was mixed intimately with 9.899 g. of ammonium bifluoride, in such manner as to have an excess of 100 per cent of ZrF$_4$. These reactants were placed in the device described in the preceding example. The flow of nitrogen assuring entrainment of HF established a relative overpressure of 5.5 cms. of mercury in the reactor. A release of gaseous hydrogen fluoride made its appearance from 98° C. onwards, and the speed of reaction rose quickly, since the temperature increase was continued.

The process evolved according to the reaction equation

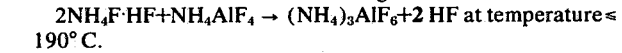
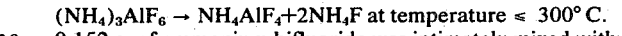

$$ZrF_4 + 3NH_4F \cdot HF \rightarrow (NH_4)_3 ZrF_7 + 3 HF$$
solid    molten          solid        gas ↗

At the end of 10 minutes, at 123° C., the HF yield was 38.5 per cent. It reached 71.0 per cent at 136° C. at the end of 20 minutes, and 92 per cent at 150° C. after 35 minutes. The test was finally interrupted at 165° C., reached at the end of 92 minutes, and the final yield of the reaction amounted to 97.4 per cent.

No ammonia was detected in the product collected.

The residue had the appearance of a porous crumbly mass. Evaluation of the rate of reaction by weight loss showed a yield of 98.9 per cent which is valid in view of the difficulty of recovering the solid totally.

19.280 g. of ZrF$_4$, ready for reuse, was recovered by heating the residual solid to 450° C.

EXAMPLE 4

In the following example, the double fluoride of aluminum and ammonium are utilized according to the reaction:

$$2NH_4F \cdot HF + NH_4AlF_4 \rightarrow (NH_4)_3AlF_6 + 2 HF \text{ at temperature} \leq 190° C.$$

$$(NH_4)_3AlF_6 \rightarrow NH_4AlF_4 + 2NH_4F \text{ at temperature} \leq 300° C.$$

9.152 g. of ammonium bifluoride was intimately mixed with 11.011 g. of ammonium tetrafluoaluminate corresponding to the accurate analysis (AlF$_3 \cdot$1.057 NH$_4$F). This ground mixture was poured into a reactor subjected to heating in an oil bath equipped with a thermostat. The temperature of the oil was regulated at 175° C. The gaseous hydrogen fluoride released was recovered in water at the outlet of the reactor. The test lasted 2 hours and 10 minutes. The reaction yield was 92 per cent in HF. The solid residue, 17.208 g., contained 15.67 g. of ammonic cryolite. This solid residue was placed into an iron reactor subjected to electric heating. After a 45 minute heating ended at 275° C., there was noted a loss in weight of 8.02 g. corresponding to the release of NH$_3$ and HF. There was 9.19 g. of a solid corresponding to the formula AlF$_3 \cdot$1.07 NH$_4$F. This product could be used again in the first reaction. The gases released were recovered by condensation in the form of ammonium fluoride which could also be used again.

The reactions set in action in the process, when utilizing a double fluoride of zirconium, are:

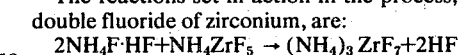

$$2NH_4F \cdot HF + NH_4ZrF_5 \rightarrow (NH_4)_3 ZrF_7 + 2HF$$
$$(NH_4)_3 ZrF_7 \rightarrow NH_4ZrF_5 + 2NH_4F$$

EXAMPLE 5

0.24 mols of ammonium bifluoride was added to one-tenth mol of yellow lead oxide PbO. When the reagents were intimately mixed they were placed in a Monel metal reactor equipped with a scavenging device by an inert gas and with a steam condensation system.

In a first step the mixture was heated to 160° C. for 2 hours, then progressively raised to 300° C. and maintained at this temperature for 4 hours.

The Pb and NH$_4$ complex fluoride thus formed was dissociated. The solid residue consisted of about 0.1 mol of lead fluoride PbF$_2$. This compound was then carefully mixed with 0.2 mols of NH$_4$HF$_2$ and the whole, still in the Monel metal reactor, was heated to 160° C. under dry air scavenging. The reaction occurred as follows:

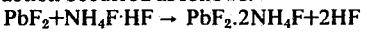

$$PbF_2 + NH_4F \cdot HF \rightarrow PbF_2 \cdot 2NH_4F + 2HF$$

The gaseous hydrogen fluoride released and was collected in water.

At the end of 4 hours under these conditions, 93 per cent of they hydrofluoric acid stoichiometrical quantity was recovered. Then the double fluoride of lead and ammonium was thermally decomposed in dry atmosphere, which allowed to recycle PbF$_2$.

EXAMPLE 6

Cobalt fluoride, $CoF_2$, was employed under the same operating conditions as the lead fluoride of Example 5. The same results were achieved with the gaseous hydrogen fluoride being collected (93 per cent) and the double fluoride of cobalt and ammonium was decomposed to permit recycling of $CoF_2$.

EXAMPLE 7

In an iron reactor swept by a dry air current, 593 g. of $(NH_4)_3FeF_6$ have been treated at 220° C. for 2 hours. 395 g. of a solid residue consisting of $NH_4FeF_4$ have been collected. The released gases are cooled at a temperature below 80° C. and the fine particles are retained by a filter bag. Furthermore, the inert gaseous current which still contains a small amount of $NH_3$ is washed with water. The condensate weighs 195 g. and corresponds to the general formula $NH_4F$, 0.2 HF. The washing solution contains 16.6 g. of $NH_3$. The reactions are:

$(NH_4)_3FeF_6 \xrightarrow{220°C} NH_4FeF_4 + 2NH_4F$ gas $2NH_4F \xrightarrow{80°C} {}_{1.628}NH_4F, 0.2HF + 0.372NH_3$ This solid is used to prepared a solution saturated at 90° C. An evaporation of this liquid phase is then performed to obtain, according to known processes, at 200° C., ammonium difluoride. The operation produces, in fact, 147 g. of a product whose formula is $NH_4F, 0.95HF$; 28 g. of $NH_3$ are liberated and recovered by washing. The reaction is the following:

$_{1.628}NH_4F, 0.2HF \xrightarrow{200°C} NH_4F, 0.95 HF + 0.628 NH_3$

Besides we have evaporated 0.635 liter of a solution of $NH_4F$ at 300 g./l concentration, resulting from the treatment of 456 g. of a solution of $H_2SiF_6$ at 27 percent with the whole of ammoniacal solutions formed during the operation and filtration of the silica formed. At 200° C. 147 g. of $NH_4F$, 0.95 HF have been obtained. The reactions are:

$H_2SiF_6 + 6NH_4OH \longrightarrow 6NH_4F_{solut.} + Si(OH)_4 + 2H_2O$ $6NH_4F \xrightarrow{200°C} 3.08(NH_4F, 0.95 HF) + 2.92 NH_3$ The whole of difluoride (394 g.) is crystallized, crushed and finally mixed with the residue originating from the first operation. A heating to 150° C. under 0.15 atm. in a Monel reactor causes a release of 100 g. of HF after 40 minutes. The gas is compressed under atmospheric pressure and then washed, first with an azeotropic solution containing 38.25 percent of HF maintained at 15° C., then with water. The reaction is:
$NH_4FeF_4 + 2NH_4F, 0.95 HF \rightarrow (NH_4)_3FeF_6 + 1.90HF$
The yield is 95 percent in HF.

EXAMPLE 8

A sample of antimony oxide $Sb_2O_3$ weighing 33 g. was placed in a vessel whose walls were covered with PTFE (teflon). To this sample was added a solution containing 40 percent of hydrofluoric acid in excess relative to the stoichiometrical reaction which involves formation of $SbF_3$. The whole was subjected to a slow evaporation in water-bath at 90° C. At the end of several hours the solution began to deposit crystals. The evaporation was continued till obtaining a slurry. The suspension was then cooled down and the solid was filtered, washed with alcohol and dried. Finally 29 g. of $SbF_3$ were collected. The antimony fluoride was removed to a Monel metal reactor in which it was mixed with 11.5 g. of ammonium difluoride resulting from dry evaporation of an ammonium fluoride solution at 300 g./l. This ammonium fluoride liquor was itself formed by neutralizing with ammonia at pH 9 a solution containing 18 percent of fluosilicic acid. The Monel reactor containing the solids $SbF_3$ and $NH_4F$, HF was placed in an oil-bath equipped with a thermostat and the temperature was raised to 130° C. From 125° C. there was an important release of hydrofluoric acid which was entrained by an inert gaseous current and absorbed by water. At the end of 1½ hours, 3.7 g. of hydrofluoric acid were collected, i.e., that the yield reached 92 percent compared to the difluoride utilized. The double fluoride of Sb and $NH_4$ was then decomposed under vacuum at 200° C. and the products collected were recycled.

EXAMPLE 9

First 0.1 mol of thorium nitrate was treated by dry process with a reagent mixture containing 0.48 mol of ammonium difluoride and 0.36 mol of ammonium fluoride. The reagents placed in a Monel metal reactor were progressively heated to 280° C. under scavenging with nitrogen till cessation of the gaseous release. The residue was washed with methanol then dried. About 30 g. of a white powder which, subjected X-rays, was admitted to be thorium fluoride were collected. In a second step the thorium fluoride thus prepared was mixed with 0.2 mol of ammonium difluoride. The whole was removed to a Monel metal closed reactor outwardly heated in an oil-bath. The reagents were raised to 150° C. as quickly as possible. From 126° C. an important release of hydrofluoric acid was noted. The acid was entrained by air and washed with water. At the end of 1 hour 3.8 g. of hydrofluoric acid were collected, i.e., that the yield reached 95 percent. All of the ammonia contained in difluoride was fixed on thorium fluoride in the form of a complex. The latter was then thermally decomposed about 280° C. and, within 3 hours, the whole of the primary thorium fluoride was recovered. The ammonium fluoride released during this operation was collected in a solid state by condensation. It was used for increasing the concentration of a $NH_4F$ ex–$H_2SiF_6$ solution which, by evaporation and thermal decomposition, will produce the ammonium difluoride required for the cycle.

I claim:

1. A process for the preparation of pure gaseous hydrogen fluoride from solid ammonium bifluoride and products containing ammonium bifluoride comprising, reacting a solid ammonium bifluoride compound with an amount of a solid metal fluoride at least equal to the quality corresponding stoichiometrically to said bifluoride, said solid metal fluoride being capable of yielding a stable ammonium fluometallate when reacted with ammonium bifluoride at a temperature above the fusion temperature of at least one of said ammonium bifluoride and the metal fluoride to obtain the quantitative release of hydrogen fluoride contained in said bifluoride and form substantially pure gaseous hydrogen fluoride and an ammonium fluometallate while maintaining the temperature between the fusion temperature of the reactant with the lowest fusion temperature and below the temperature at which the ammonium fluometallate decomposes and recovering the gaseous hydrogen fluoride, said reaction being carried out in an anhydrous medium.

2. The process as set forth in claim 1 wherein the metal fluoride is selected from the group consisting of the fluorides of Bi, Cd, Be, Co, Cu, Fe, Mg, Mn, Ni, Sn, Th, Ti, Zn, Al, In, Zr, Cr, V, Ge, U, Ga, Sc, Pb, Hf and Sb.

3. The process as set forth in claim 1 wherein the metal fluoride is a double fluoride of ammonium and a metal selected from the group consisting of Al, Fe, Zr, In, Cr, V and U.

4. The process as set forth in claim 1 wherein the temperature is maintained between 125° and 200°C.

5. The process as set forth in claim 1 wherein the reaction is carried out at a pressure above atmospheric pressure.

6. A cyclic process for the preparation of pure gaseous hydrogen fluoride from solid ammonium bifluoride and products containing ammonium bifluoride comprising the steps of:

A. Reacting the solid ammonium bifluoride compound with an amount of a solid metal fluoride at least equal to the quantity corresponding stoichiometrically to said bifluoride, said solid metal fluoride being capable of yielding a stable ammonium fluometallate when reacted with ammonium bifluoride at a temperature above the fusion temperature of at least one of the ammonium bifluoride and the metal fluoride to obtain the quantitative release of hydrogen fluoride contained in said bifluoride and form substantially pure gaseous hydrogen fluoride and an ammonium fluometallate while maintaining the temperature between the fusion temperature of the reactant with the lowest fusion temperature and below the temperature at which the ammonium fluometallate decomposes;

B. Maintaining said temperature until the evolution of pure gaseous hydrogen fluoride substantially ceases;

C. Recovering the gaseous hydrogen fluoride; and,

D. Increasing the temperature to a temperature above the decomposition temperature of the ammonium fluometallate to decompose it into ammonium fluoride and the metal fluoride used in step A.

7. The process as set forth in claim 6 wherein the metal fluoride is selected from a group of metals consisting of Bi, Cd, Be, Co, Cu, Fe, Mg, Mn, Ni, Sn, Th, Ti, Zn, Al, In, Zr, Cr, V, Ge, U, Ga, Sc, Pb, Hf and Sb.

8. The process as set forth in claim 6 wherein the metal fluoride is a double fluoride of ammonium and a metal selected from the group consisting of Al, Fe, Zr, In, Cr, U and V.

9. The process as set forth in claim 6 wherein temperature of step A is between about 125° and 200° C.

10. The process as set forth in claim 6 wherein the pressure of the reaction is slightly above atmospheric.

11. The process for the production of pure gaseous hydrogen fluoride from industrial waste gases containing fluoroderivatives absorbable by ammonia comprising:

A. Washing the industrial waste gases with ammonia to produce a solution containing ammonium fluoride;

B. Heating the solution containing ammonium fluoride liberating gaseous ammonia and extracting a product containing ammonium bifluoride;

C. Reacting the product containing ammonium bifluoride with an amount of a solid metal fluoride at least equal to the quantity corresponding stoichiometrically to said bifluoride, said solid metal fluoride being capable of yielding a stable ammonium fluometallate when reacted with ammonium bifluoride at a temperature above the fusion temperature of at least one of the ammonium bifluoride and the metal fluoride to obtain the quantitative release of hydrogen fluoride contained in said bifluoride and form gaseous hydrogen fluoride and ammonium fluometallate at a temperature between the fusion temperature of the reactant with the lowest fusion temperature and below the temperature at which the ammonium fluometallate decomposes and maintaining said temperature until the evolution of gaseous hydrogen fluoride substantially ceases;

D. Recovering the gaseous hydrogen fluoride;

E. Increasing the temperature to a temperature above the decomposition temperature of the ammonium fluometallate to decompose it into ammonium fluoride and the metal fluoride used in step C;

F. Collecting the gaseous ammonium fluoride liberated in step E and recycling it for use in step B; and G. Collecting the metal fluoride from step E and recycling it for use in step C.

* * * * *

UNITED STATES PATENT OFFICE
CERTIFICATE OF CORRECTION

Patent No. 3,645,681   Dated February 29, 1972

Inventor(s) Roland Bachelard

It is certified that error appears in the above-identified patent and that said Letters Patent are hereby corrected as shown below:

Column 1 Line 38 --bases-- should read --gases--. Column 4 Line 68 --$NH_4$-- should read --$2NH_4$--. Claim 1 Column 6 Line 40 --quality-- should read --quantity--.

Signed and sealed this 11th day of July 1972.

(SEAL)
Attest:

EDWARD M. FLETCHER, JR.       ROBERT GOTTSCHALK
Attesting Officer      Commissioner of Patents